Feb. 20, 1951     F. L. BARNEY     2,542,617
ATTACHMENT FOR LIFTING AND DEFLECTING PLANTS
Filed Dec. 7, 1948     2 Sheets-Sheet 1
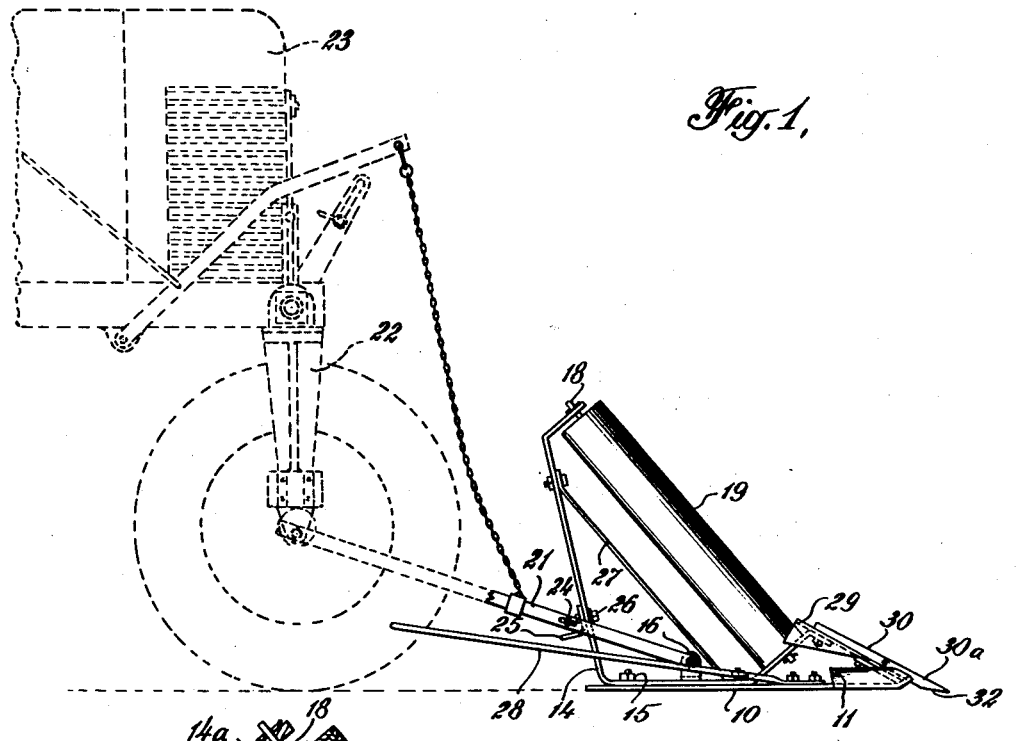
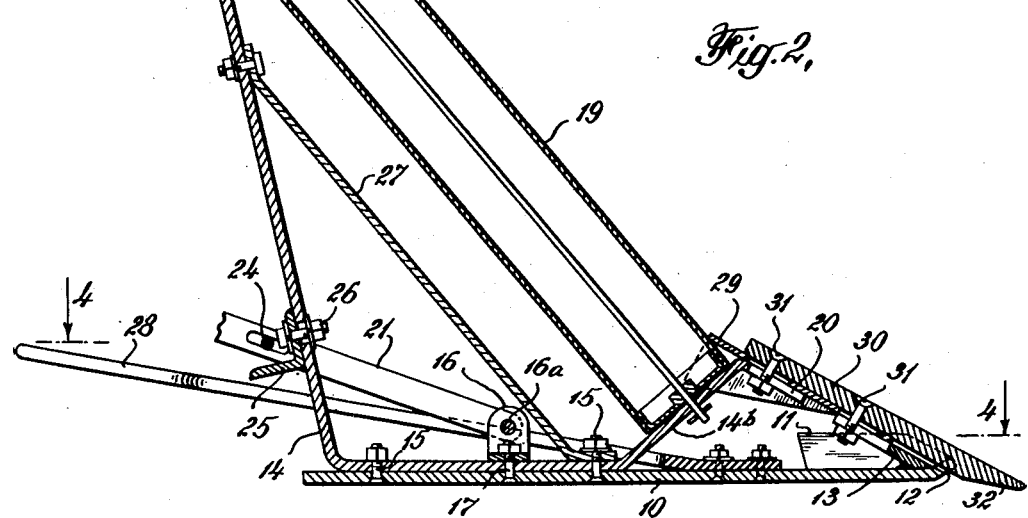
INVENTOR
Francis L. Barney
BY
Pennie Edmonds Morton Barrows
ATTORNEYS

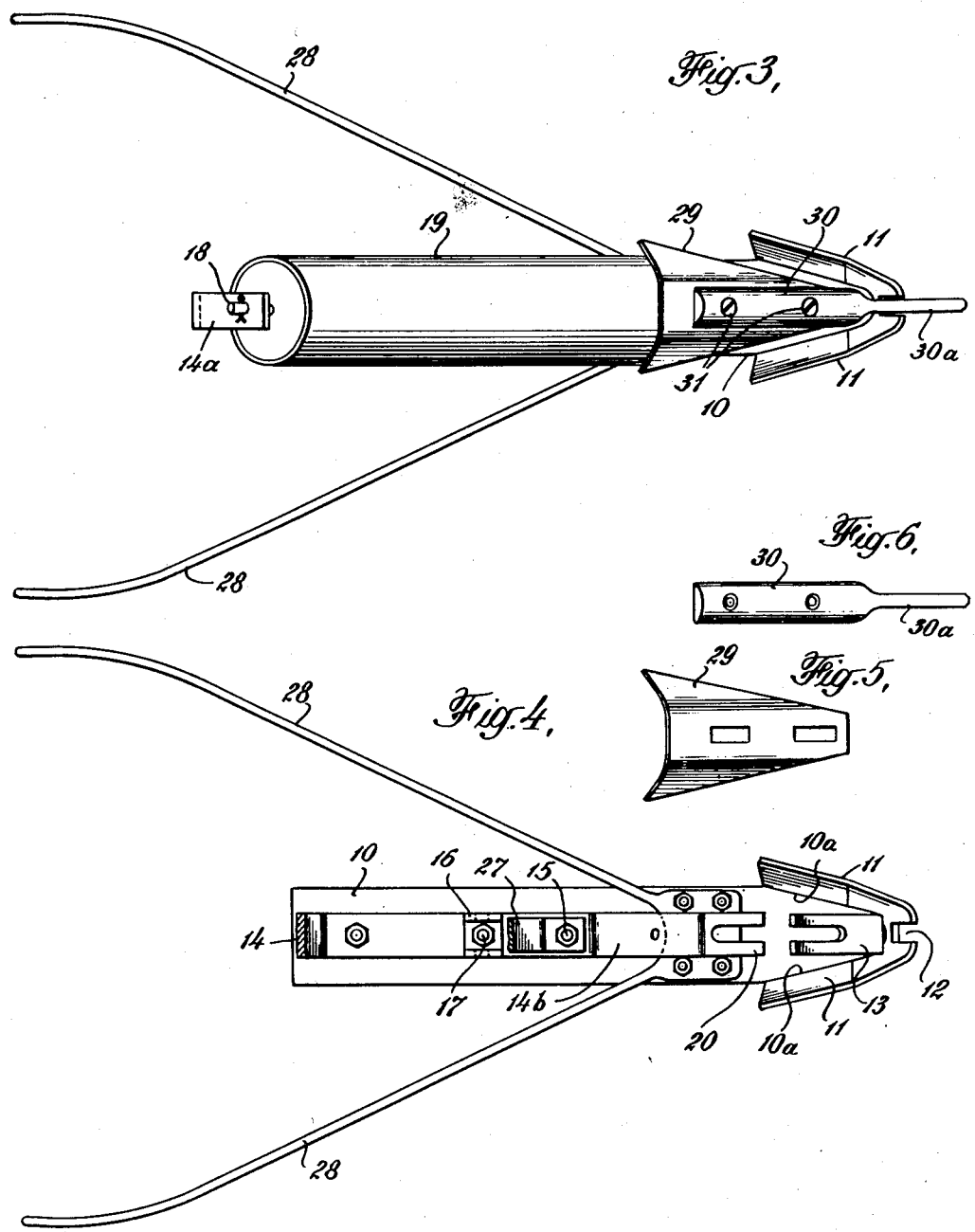

UNITED STATES PATENT OFFICE 2,542,617

ATTACHMENT FOR LIFTING AND DEFLECTING PLANTS

Francis L. Barney, Parma, Idaho

Application December 7, 1948, Serial No. 63,902

4 Claims. (Cl. 97—192)

This invention relates to attachments for use on a vehicle, in the harvesting of crops, such as beans, which are planted in rows and produce vines, which spread between the rows and become entangled and must be lifted and separated preliminary to harvesting. More particularly, the invention is concerned with a novel attachment of the type described, which is superior to prior attachments in that it is easier to use, is less likely to pass over vines and become clogged, and tends to remain in proper position between the rows, so that it may help guide the vehicle on which it is mounted.

One form of attachment now employed on tractors for lifting and dividing bean vines preliminary to harvesting comprises a rail or shoe, which rests on and slides over the ground and is propelled by a pair of bars pivotally attached at one end to the rail and secured at the other end either to the lower ends of the fork of a front wheel of the tractor or to parts of a frame carried by the tractor. At its front end, the rail is bent upwardly and then downwardly and forwardly at an angle of about 45° to terminate in a bracket, on which a divider point member is mounted. The member projects forwardly ahead of the rail to end in a point, which penetrates the ground a considerable distance ahead of the forward end of the surface of the rail in contact with the ground and forms a shallow furrow. To the rear of the point member, the rail carries a bracket, in which is mounted a roller aligned with the member and extending upwardly and rearwardly therefrom, and the forward end of the roller bracket supports the rear end of the point member and also a guard, which overlies the lower end of the roller. A pair of divider rods are mounted on the rail and project outwardly and upwardly toward the rear.

The prior attachment described causes difficulties in operation, because the divider point member penetrates the ground so far ahead of the forward end of the ground contact surface on the rail that the member tends to pull the forward end of the rail into the ground. To counteract this tendency, the lower surface of the divider point member at its front end is commonly formed with a forward and upward inclination but, when the pointed end of the member has this shape, the member tends to rise out of the ground and may pass over vines with resultant clogging of the attachment.

The attachment of the invention overcomes the objections to the prior attachment and is so constructed that the point member has a better support and can not pull the front end of the rail into the ground. The point member remains in the ground at all times, so that it does not pass over any of the vines, and the attachment helps to guide the tractor, when mounted on the front wheel fork, and keeps the tractor in proper position in the rows.

For a better understanding of the invention, reference may be had to the accompanying drawings, in which Fig. 1 is a view of the new attachment in side elevation;

Fig. 2 is a vertical sectional view through the attachment;

Fig. 3 is a plan view of the attachment;

Fig. 4 is a sectional view on the line 4—4 of Fig. 2;

Fig. 5 is a plan view of a roller guard; and

Fig. 6 is a plan view of the divider point member.

The new attachment comprises a divider rail 10, which is a flat plate of metal, the sides of which are parallel throughout most of the length of the rail but converge toward its front end, as indicated at 10a. A pair of extensions 11 rise from the rail along its convergent edges and at its front end, and the extensions diverge upwardly. The front ends of the extensions are separated to form a slot 12 in the axis of the rail and, immediately to the rear of the slot, an upwardly and rearwardly inclined bracket 13 is secured to the top surface of the rail.

A roller bracket 14 is mounted on the top of the rail near its rear and is held in place by bolts 15, which pass through openings in the bracket and the rail. A bracket 16 is mounted on top of bracket 14 and is held in place by a bolt 17 passing through the two brackets and the rail. The rear portion of the bracket 14 extends upwardly and rearwardly from the rail and terminates in an end section 14a. At its front end, the bracket has a portion 14b which extends upwardly and forwardly to lie parallel with the section 14a. The roller bracket sections 14a, 14b are provided with openings, through which passes a rod 18, on which is mounted a roller 19. Beyond the roller, the end of section 14b of the roller bracket extends forwardly and downwardly to provide a bracket 20 lying in alignment with bracket 13. The attachment is propelled by means of a pair of bars 21, which are pivotally secured at their front ends on a pin 16a in bracket 16 and may have their rear ends pivotally attached to the lower ends of the fork 22 of a front wheel of a tractor 23. The bars 21 are connected to the rear of the roller bracket 14 by a rod 24 and bracket 14 carries an angle member, one leg 25 of which lies beneath rod 24. The angle member is secured to the roller bracket by a bolt 26, and tilting of the attachment as a whole on a horizontal axis through the pin 16a is limited by engagement with the rod 24 of either bolt 26 or arm 25 of the angle member.

The roller bracket is stiffened by a brace 27 bolted at one end to the substantially vertical portion of the bracket and having its other end secured to the rail and to the bracket by the forward bolt 15. The rail carries a pair of divider rods 28, which are attached to the rail in front of the roller bracket and extend outwardly and upwardly to the rear.

A roller guard 29 is mounted on brackets 13 and 20 and extends rearwardly beyond bracket 20 to overlie the lower end of roller 19. A divider point member 30 is mounted on brackets 13, 20 to overlie the roller guard, the member and the guard being held in place by bolts 31. The divider point member projects downwardly and forwardly ahead of the front end of the rail and the forward end 30a of the point member is narrowed, so that it may pass through the slot 12 between the ends of extensions 11. At its forward end, the bottom of the point member is cut off at an angle, so that the member terminates in a point and its bottom surface 32 lies substantially horizontal, when the member is in operative position. When the attachment is in use, the tip of the point member lies slightly below the plane of the bottom surface of the rail.

In the new attachment, the area of contact of the rail with the ground is substantially longer than in the prior attachment and the rail extends substantially to the pointed end of the point member. The member thus has only a short front end section that is free and unsupported and, although the member operates with its pointed end beneath the ground surface and with the tip of the point forming its lowest part, the member can not pull the forward end of the rail into the ground. The point member thus remains in the ground at all times and does not pass over vines with resultant clogging of the attachment. The extensions from the rail at its forward end tend to keep the rail in proper position as it advances, and the attachment, when mounted on the front wheel of a tractor, will thus remain in proper position and help to guide the tractor. This is important when the rows are not easily distinguishable either because of the thickness and tangling of the vines or because the tractor is being operated in the early morning and before full daylight. Use of the tractor with the attachment at this time is desirable because, when the dew is still on the vines, cracking of the bean pods is avoided.

I claim:

1. In a harvester attachment for use on a vehicle, the combination of a rail adapted to slide along the ground, a bracket attached to the rail at its forward end and extending upwardly and rearwardly from said end, a divider point member mounted on the bracket and extending rearwardly beyond the bracket, and means on the rail for supporting the rear end of the divider point member beyond the bracket, the divider point member having a short free front end section extending ahead of the rail and terminating in a point.

2. In a harvester attachment for use on a vehicle, the combination of a rail adapted to slide along the ground and having convergent side edges adjacent its front end and extensions rising from said edges, a bracket attached to the rail at its forward end between the extensions and extending upwardly and rearwardly from said end, a divider point member mounted on the bracket and extending rearwardly beyond the bracket, and means on the rail for supporting the rear end of the member beyond the bracket, the member having a short free front end section extending between the extensions and ahead of the rail and terminating in a point.

3. In a harvester attachment for use on a vehicle, the combination of a rail adapted to slide along the ground and having convergent side edges adjacent its front end, upwardly divergent extensions rising from said edges, a bracket attached to the rail at its forward end between the extensions and extending upwardly and rearwardly from said end, the forward ends of the extensions extending upwardly and forwardly from the front end of the rail and being spaced apart, a divider point member mounted on the bracket and extending rearwardly beyond the bracket, and means on the rail for supporting the rear end of the member beyond the bracket, the member having a short free front end section extending between the forward ends of the extensions and ahead of the rail and terminating in a point.

4. In a harvester attachment for use on a vehicle, the combination of a rail adapted to slide along the ground and formed with convergent lateral edges at its forward end, integral plow extensions diverging upwardly from said edges of the rail and terminating close together but spaced apart at the front end of the rail, a divider point member extending forwardly and downwardly above the rail and passing between the spaced forward ends of the extensions to project ahead of the rail and terminate in approximately the plane thereof, and means on the rail for supporting the divider point member in position.

FRANCIS L. BARNEY.

REFERENCES CITED

The following references are of record in the file of this patent:

UNITED STATES PATENTS

| Number | Name | Date |
|---|---|---|
| 349,916 | Woodley | Sept. 28, 1886 |
| 476,802 | Lee | June 14, 1892 |
| 2,352,506 | Zirckel | June 27, 1944 |